United States Patent
Xu et al.

(10) Patent No.: US 8,108,348 B2
(45) Date of Patent: Jan. 31, 2012

(54) MULTI-VERSION CONTROL METHOD FOR DATA DOCUMENTS AND DEVICE THEREOF

(75) Inventors: Zeming Xu, Beijing (CN); Xiaorui Zhao, Beijing (JP); Liyuan Zhao, Beijing (JP)

(73) Assignees: Beijing Lenovo Software Ltd., Beijing (CN); Lenovo (Beijing) Limited, Beijing (CN)

( * ) Notice: Subject to any disclaimer, the term of this patent is extended or adjusted under 35 U.S.C. 154(b) by 482 days.

(21) Appl. No.: 12/231,474

(22) Filed: Sep. 3, 2008

(65) Prior Publication Data
US 2009/0070367 A1 Mar. 12, 2009

(30) Foreign Application Priority Data
Sep. 6, 2007 (CN) .......................... 2007 1 0121445

(51) Int. Cl.
*G06F 7/00* (2006.01)
(52) U.S. Cl. ......... 707/638; 707/695; 707/711; 707/752
(58) Field of Classification Search .................. 707/690, 707/695, 696, 698, 638, 711, 747, 752, 634, 707/635, 636, 637
See application file for complete search history.

(56) References Cited

U.S. PATENT DOCUMENTS

| | | | |
|---|---|---|---|
| 6,785,786 B1 * | 8/2004 | Gold et al. | 711/162 |
| 2002/0152218 A1 * | 10/2002 | Moulton | 707/100 |
| 2003/0163496 A1 | 8/2003 | Terazono et al. | |
| 2004/0181561 A1 | 9/2004 | Knox et al. | |
| 2006/0112264 A1 * | 5/2006 | Agarwal | 713/150 |
| 2006/0288002 A1 * | 12/2006 | Epstein et al. | 707/6 |
| 2009/0193521 A1 * | 7/2009 | Matsushima et al. | 726/22 |

\* cited by examiner

*Primary Examiner* — Amy Ng
(74) *Attorney, Agent, or Firm* — Kinney & Lange, P.A.

(57) ABSTRACT

The invention discloses a multi-version control method for data documents, and a device thereof. The method comprises generating data-block fingerprints for all data blocks of a benchmark version; determining common data contents common between a newer version and the benchmark version according to the data-block fingerprints, and indexing the common data contents; determining the data contents peculiar to the newer version, i.e. not contained in the benchmark version according to the indexes, and indexing these particular data contents; determining positions of these data contents in the newer version according to the indexes; determining the data blocks with identical data contents between the two versions through the comparisons of data-block fingerprints and data contents; extracting the data contents common between the two versions, the data contents peculiar to the newer version, as well as the positions of the data contents in the newer version.

10 Claims, 2 Drawing Sheets

MULTI-VERSION CONTROL METHOD FOR DATA DOCUMENTS AND DEVICE THEREOF

BACKGROUND OF THE INVENTION

1. Field of Invention

The present invention relates to computer technology, particularly to a multi-version control method for data documents, and a device thereof.

2. Description of Prior Art

A general processing procedure for software upgrade proceeds as follows: mismatched blocks are generated through finding mismatched points of data contents between a lower-version document and a higher-version document; related editing actions are estimated through the found matched blocks and mismatched blocks, wherein the actions include copying, replacing inserting and deleting; then the related editing actions are performed to replace contents in a lower-version document with contents in a higher-version document. However, in such a processing procedure for software upgrade, the editing actions are multifarious and numerous. The processing time for recovering software from the generated increments is long and time efficiency is poor.

Additionally, there exists a method for upgrading the data documents by means of increments. Particularly, when a data document is being upgraded, only the data document added in the newer version needs to be combined with the data document in the elder version (including the original data document and the elder upgraded versions), and indexes corresponding to the data documents of elder versions and newer version are established respectively. Also, the user can obtain the data document of elder versions and the upgraded data document of newer version by the established indexes, and perform the operations of selecting a version or switching between versions at any time; thereby the user can switch between the versions of documents flexibly. However, this method only establishes a corresponding indexing relationship between the numerous documents of the two versions of a software. In addition, the method can't perform compression of detailed contents for a particular document. Therefore, the compression rate is not high enough.

In summary, all the existing processing methods that based on software upgrading cannot perform relevant processing for the data documents of different versions.

SUMMARY OF THE INVENTION

Accordingly, an object of the present invention is to provide a multi-version control method for data documents and a device thereof, capable of determining the common data contents between the data documents of two versions and the particular data contents in the data document of the newer version.

To achieve the object, a technical scheme of the present invention is implemented as follows.

A multi-version control method for data documents, which comprises steps of:

A. generating data-block fingerprints for all data blocks of a benchmark version;

B. determining common data contents between a newer version and the benchmark version according to the data-block fingerprints; and indexing the common data contents with an index containing a length of the common data contents and locations of the common data contents between the benchmark version and the newer version; based on these indexes, determining particular data contents which are contained in the newer version but not contained in the benchmark version.

Preferably, the step A comprises: partitioning each data block into some fixed-length sub-blocks starting from the beginning position of the benchmark version, the length of each sub-block is equal to a length of the data-block fingerprint; performing the exclusive-OR (XOR) operation on the data contents of the sub-blocks, and a result of XOR is used as the data-block fingerprint.

Preferably, the step A comprises: obtaining the data-block fingerprint of a current data block by performing the XOR operation on three components, i.e. a data-block fingerprint of a previous data block, data contents of a first sub-block in the previous data block, and data contents of a last sub-block in the current data block.

Preferably, the step A comprises: rearranging the data-block fingerprints for all data blocks in the benchmark version by heap sort; and among the rearranged data-block fingerprints, only preserving all the data-block fingerprints that appears no more than a predetermined number.

Preferably, the step B comprises:

B1. starting from the beginning position of the newer version, generating the data-block fingerprint for the fixed-length data block;

B2. performing a binary search on the rearranged data-block fingerprints of the benchmark version; determining whether the data-block fingerprint of the newer version appears in the rearranged data-block fingerprints of the benchmark version or not; if yes, proceeding to step B3; otherwise, proceeding to step B6;

B3. determining whether the contents of the data block of the newer version are identical to contents of a corresponding data block of the benchmark version or not; if yes, proceeding to step B4; otherwise, proceeding to step B6;

B4. expanding and comparing the identical data contents for the data block of the newer version and the data contents of the data block in the benchmark version; terminating the expanding and comparing when related data contents are distinct; indexing the common data contents; and proceeding to step B5;

B5. determining whether the last data block of the newer version has been traversed or not; if yes, indexing the data contents peculiar to the newer version and terminating a current process; otherwise, generating a data-block fingerprint for the data block starting at a beginning position of the newer version which has not been traversed, and then returning to step B2;

B6. determining whether the last data block in the newer version has been traversed or not; if yes, indexing the data contents peculiar to the newer version and terminating the current process; otherwise, in the newer version, shifting the current data block forward by pre-set bytes to obtain another data block of fixed length, and generating a data-block fingerprint for the newer data block, and then returning to step B2.

Preferably, the step B4 of expanding and comparing the identical data contents for the data block of the newer version and the data contents of the data block in the benchmark version comprises: comparing consecutively the data contents in a forward direction and in a backward direction.

Preferably, the method further comprises, after the step B, after the step B, arranging the indexes of the data contents for various parts to generating a set of indexes for the newer version, the set of indexes not only contains indexes of the data contents peculiar to the newer version, but also indexes of the identical data contents; and sorting the set of indexes according to beginning positions of data blocks in the newer version.

Preferably, after the step B, the method further comprises step C: after the step B: for various newer versions in a version phase, extracting the common data block contents in respect of the benchmark version as well as the common data block contents peculiar to the newer versions; and sorting the common data block contents only once.

Preferably, the method further comprises, after the step C, during restoration of the newer version, restoring the newer version according to the beginning positions of various data blocks in the set of indexes for the newer version.

A multi-version control device for data documents comprises: a data-block fingerprint extractor, a data-block fingerprint comparator, a data-block content comparator and an index generator. The data-block fingerprint extractor is used for generating data-block fingerprints of all the data blocks with fixed lengths in a benchmark version, and generating a data-block fingerprint of a data block with a fixed length in a newer version; the data-block fingerprint comparator is used for determining whether there exists a data-block fingerprint in the benchmark version that is identical to the data-block fingerprint in the newer version or not; if yes, notifying the data-block content comparator to compare data block contents; otherwise, notifying the data-block fingerprint extractor to generate the data-block fingerprint of the next data block in the newer version; the data-block content comparator is used for comparing whether the contents of two data blocks with the common data-block fingerprints are identical or not; if yes, expanding and comparing around the two data blocks until running into distinct data contents, and providing the obtained common data contents to the index generator. Otherwise, notifying the data-block fingerprint extractor of generating the data-block fingerprint for the next data block in the newer version; the index generator is used for indexing the common data block contents between the newer version and the benchmark version and the data contents peculiar to the newer version, and sorting the indexes of the data contents of the various parts according to their turns in the newer version.

Preferably, the data-block fingerprint extractor is further used for re-arranging all the data-block fingerprints of the benchmark version by heap sort; and in the re-arranged data-block fingerprints, preserving all the data-block fingerprints that appear no more than a predetermined number.

Preferably, the device further comprises a common information extractor, which is used for extracting common data block contents of various newer versions in one version phase relative to the benchmark version and the common data block contents peculiar to the newer versions; and sorting the common data block contents only once.

Preferably, the device further comprises a data restoring processor, which is used for restoring the newer version according to beginning positions of various data blocks in a set of indexes in the newer version.

In the present invention, the data-block fingerprints of the data block in the benchmark version is generated; data contents in the newer versions that are identical to some data contents in the benchmark version are determined according to the data-block fingerprint, and the common data contents are indexed; each of the indexes contain length of the common data contents and locations of the common data contents in the benchmark version and the newer version. Data contents peculiar to the newer version and not contained in the benchmark version are determined and indexed according to the indexes. The common data contents in both of the versions, the data content peculiar to the newer version, and the positions of data contents of various parts are distinguished. The above processing is quick and convenient without any complex processes.

According to the scheme of the present invention, rather than the complete data contents of the newer version, only the length information and the position information of the common data contents between the benchmark version and the newer version and the information of the data contents peculiar to the newer version are stored. Therefore, storage space is considerably reduced, and all of data contents of the newer version can be quickly restored, which has a good time efficiency.

Additionally, in a certain duration, when many distinct newer versions are generated in respect of a benchmark version, the common data contents peculiar to the newer versions are extracted. These data contents and the indexes thereof are stored. Then, the particular distinct data contents of the various newer versions relative to the benchmark data are extracted, and the data contents and the indexes thereof are stored. Therefore, the compression and restoration of the multiple versions of one data document are implemented, and the compression rate is improved further.

DETAILED DESCRIPTION OF PREFERRED EMBODIMENTS

In the present invention, data documents are differentiated into a benchmark version and some newer versions. Data contents common between the newer versions and the benchmark version, and those peculiar to the newer versions are determined according to the scheme provided by the present invention, so as to implement a control to a multi-version data document. The process comprises: the data-block fingerprints of the data blocks in the benchmark version are generated; data contents in the newer versions that are the same as some data contents in the benchmark version are determined according to the data-block fingerprints; and the common data contents are indexed; each of the indexes comprises length of the common data contents and respective locations of the common data contents in the benchmark version and the newer versions. Data contents peculiar to the newer versions, i.e. not contained in the benchmark version are determined according to the indexes, and these data contents are indexed. Positions of the data contents in the newer versions are determined according to the indexes.

Figure 1:
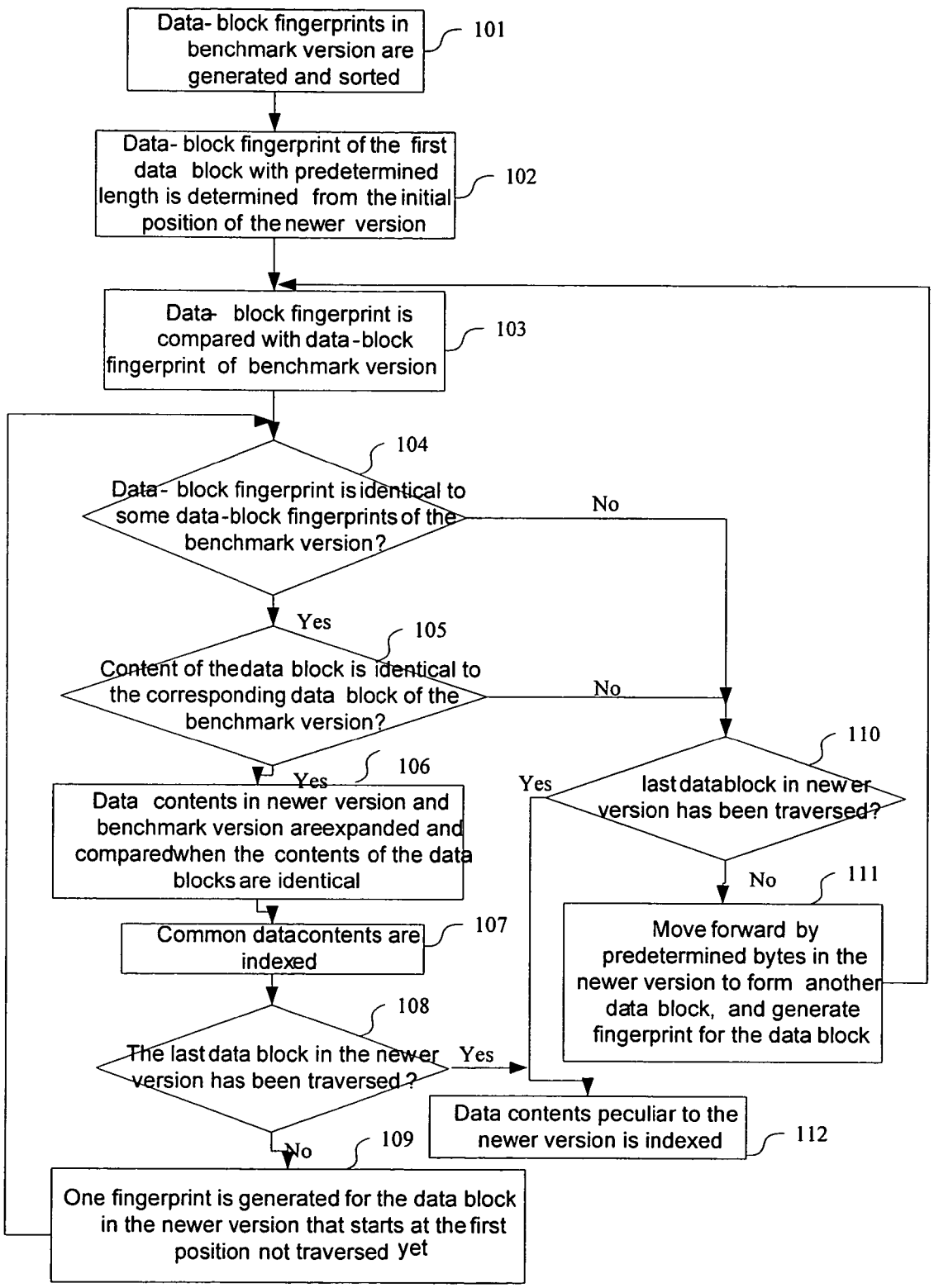
FIG. 1 is a flow chart for determining identities and differences between contents of the different versions of a data document according to the present invention.

FIG. 1 is a flow chart for determining the identities and differences between the contents of a data document of different versions according to the present invention. As shown in FIG. 1, an electrical document is taken as an example in the present invention. The process for determining the similarities and differences between contents of different versions of the data document comprises steps of:

In Step 101, data-block fingerprints of various data-blocks for the benchmark version are generated and rearranged. The process may comprises: starting from the beginning position of the benchmark version, each data block with the fixed length (such as 1K bytes) is divided into some sub-blocks with the fingerprint length (such as 4 bytes); perform the XOR operation on the data contents of these sub-blocks, and the final result is used as the data-block fingerprint of the data block; and then move forward by a fixed length (such as 1 byte) from the beginning position of current data block to obtain another data block with the fixed length and starting from the new beginning position. The new data block is divided into some sub-blocks with a preset length. Perform the XOR operation on the data contents of these sub-blocks, and the final result is used as the data-block fingerprint. Repeat the process until completing all the data contents of the benchmark version. For example, the data-block starting from beginning position of the benchmark version with the length of 1K bytes is determined. Furthermore, the data block is divided into some sub-blocks with the length of 4 bytes. Then perform the XOR operation on the data contents of the sub-blocks, and the final result is used as the data-block fingerprint of the data block. Then move forward by 1 byte from the beginning position of current data block to obtain another data block with 1K bytes and starting from the new beginning position. The new data block is divided into some sub-blocks with a length of 4 bytes. Perform the XOR operation on the data contents of these sub-blocks, and the final result is used as the data-block fingerprint. Repeat the process until completing all the data contents of the benchmark version. The length of the fingerprint refers to the coding length of each fingerprint.

Additionally, in the consecutive two data blocks, the current data block and the previous data block, the current data block is obtained by moving the previous data block forward by a predetermined number of bytes. Therefore, fingerprints of the two adjacent data blocks may be obtained from each other due to the specific characteristic of the XOR operation. That is to say, the data-block fingerprint of the current data block may be obtained by performing the XOR operation on the data-block fingerprint of the previous data block, the data content of the first sub-block in the previous data block, and the data content of the last sub-block in the current data block. Therefore, the related processing of the data-block fingerprints may be simplified.

Perform the heap sort on the obtained data-block fingerprints of the benchmark version. Thus, based on the sorted result, when searching the data-block fingerprints of the benchmark version for a special data-block fingerprint of the newer version, we are facilitated by using some search processing (such as a binary search). The processing is rapid and convenient. Moreover, because the purpose of the data-block fingerprints is used to index the contents of the data blocks, the data-block fingerprints of the benchmark version may be cleansed further after they are generated. That is to say, among the sorted data-block fingerprints, only the data-block fingerprints that occurs no more than a predetermined number are preserved, e.g. only the data-block fingerprints whose number of repetition is 1 are left.

In Step 102, a data block with the predetermined length is determined starting from the beginning position of the newer version, and the length of the data block is the same as that in the benchmark version. The data block is divided into some sub-blocks, and the length of each sub-block is the same as that in the benchmark version. Perform the XOR operation on the data contents of the sub-blocks, and the final result is the data-block fingerprint of the data block.

In Step 103, compare the data-block fingerprint of the newer version obtained in step 102 with the data-block fingerprints of the benchmark version.

In Step 104, determine whether there exists the data-block fingerprint of the benchmark version is identical to some data-block fingerprints of the newer version or not. If there exists, it is indicated that the contents of the two data blocks are likely to be identical, and the process proceeds to step 105 to compare further the contents of the data blocks. Otherwise, the process proceeds to step 110.

In Step 105, determine whether the content of the data block in the newer version is identical to the content of the corresponding data block in the benchmark version or not. That is to say, the content of each byte of the two data blocks are compared sequentially. If all the contents are the same, the process proceeds to step 106; otherwise, the process proceeds to step 110.

In Step 106, expand and compare data contents between the newer version and the benchmark version around the data blocks whose fingerprints are the same until the data contents are different. In order to obtain the maximum common data contents, the expansion and comparison can be performed in both the forward direction and the backward direction. That is to say, backward from the bytes immediately before the first bytes of the data blocks, forward from the bytes immediately after the last bytes of the two data blocks, compare byte by byte. Once the bytes are distinct, the comparison in that direction stops.

In Step 107, the identical data contents are indexed when different data contents appear. The index indicates the position of the identical data content in the benchmark version, the position of the identical data content in the newer version, as well as the length of the data block.

In Step 108, determine whether the last data block of the newer version has been traversed or not. If it has been traversed, the process proceeds to step 112; otherwise, proceeds to step 109.

In Step 109, generate the data-block fingerprint for the data block that starts from the beginning position in the newer version that has not been traversed. That is to say, the predetermined fixed-length data block in the newer version starts at the position where the data content begins to differ from the corresponding position in the benchmark version. The length of the data block is the same as that in the benchmark version. The data block is divided into some sub-blocks, and the length of each sub-block is the same as that in the benchmark version. Perform the XOR operation on the data contents of the sub-blocks, and the final result is used as the data-block fingerprint of the data block. Then, the process returns to step 103.

In Step 110, determine whether the last data block in the newer version has been traversed or not. If it has been traversed, the process proceeds to step 112; otherwise, proceeds to step 111.

In Step 111, in the newer version, move the beginning position forward by predetermined-number bytes to obtain the new beginning position. Determine a predetermined-length data block that starts from the new beginning position. Then the data block is divided into some predetermined-length sub-blocks, and the XOR operation is performed on data contents of the sub-blocks. The final result is used as the data-block fingerprint for the data block. Then, the process returns to step 103.

If in Step 106, during the byte-by-byte comparison of data contents in the forward direction before the data blocks with the same data-block fingerprints, once the different bytes are encountered, another data block in the newer version should be considered. The data block in the newer version begins at the position where the different bytes are just encountered.

In step 112, according to the indexes of the data blocks common between the newer version and the benchmark version, index the data content peculiar to the newer version. This index indicates the position of the data content peculiar to the newer version and its length.

After the data contents common between the newer version and the benchmark version and the data contents peculiar to the newer version being determined, the indexes of these data contents can be rearranged so as to obtain a set of indexes for the newer version. The index set comprises not only the indexes for the data contents for the newer version, but also the indexes for the data contents common the newer version and the benchmark version. The indexes in the index set are arranged sequentially according to their subscripts in the newer version.

As mentioned above, according to the present invention, complete data contents of the newer version do not need to be stored. Only the following information are stored: the benchmark version, the data contents peculiar to the newer version and their position information, as well as the position information and the length information about the data contents common between the newer version and the benchmark version. Therefore, storage space is considerably reduced, and all the data contents in the newer version can be restored rapidly, which demonstrated excellent time-efficiency. During the restoration of the data content of the newer version, proceed sequentially according to the beginning positions of the indexes in the newer version.

In one version phase, it is likely that many different newer versions are generated in respect of the benchmark version. At this time, a series of indexes may be generated based on the benchmark version so as to improve the compression rate further. In a version phase, the data contents common between the newer versions and the benchmark version, and the common data contents peculiar to the newer versions are extracted. These data contents and related indexes may be stored in a common storage area only once. This reduces the storage amount further. Thus, in a version phase, the data contents common between the newer versions and the benchmark version can be stored in the common storage area. The data contents peculiar to the newer versions may be stored in their particular storage areas. When a certain newer version of a certain version phase is restored, only the corresponding indexes and data contents are fetched from the common storage area, and the data contents and indexes peculiar to this newer version are fetched from the particular storage area of this version. The common data contents peculiar to the newer versions refer to the data contents that are not contained in the benchmark version, but contained in all the newer versions.

The above operations may be completed by the data document multi-version control device or application software.

Figure 2:
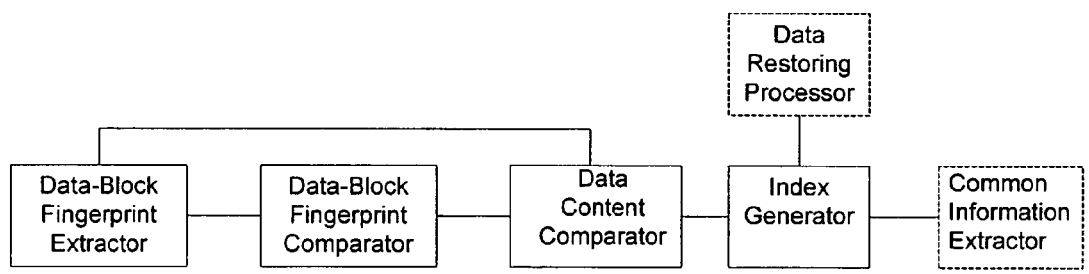
FIG. 2 is a structural schematic view of a data document multi-version control device.

FIG. 2 is a structural schematic view of a data document multi-version control device. As shown in FIG. 2, the device comprises: a data-block fingerprint extractor, a data-block fingerprint comparator, a data-block content comparator and an index generator. The data-block fingerprint extractor is used for generating data-block fingerprints of all the fixed-length data blocks in a benchmark version, and providing data-block fingerprints to the data-block fingerprint comparator, i.e. generating data-block fingerprints of some fixed-length data blocks in a newer version when needed. The data-block fingerprint comparator is used for determining whether there exists a data block fingerprint in the benchmark version that is identical to the data-block fingerprint in the newer version or not. If there exists, notifying the data content comparator of comparing data-block contents; otherwise, notifying the data block fingerprint extractor of generating a data block fingerprint of a next data block in the newer version. The data content comparator is used for, when the data-block fingerprint in the newer version is identical to some data-block fingerprint in the benchmark version, comparing sequentially whether the contents of these two data blocks with the identical data-block fingerprints are also identical or not. If they are identical, in order to obtain the maximum identical data contents, expanding and comparing forward and backward the identical data contents around the identical data blocks between the newer version and benchmark version. Once the data contents are distinct, stopping comparison, providing the obtained common data contents to the index generator, and notifying the index generator of indexing the common data contents. Otherwise, notifying the data-block fingerprint extractor of generating the data-block fingerprint of the next data block in the newer version. Furthermore, the data-block fingerprint extractor is used for sorting all the data-block fingerprints of the benchmark version by heap sort, and preserving all the data-block fingerprints that occurs no more than a fixed number (such as 1) in the sorted data-block fingerprints. The index generator is used for indexing the data contents common between the newer version and the benchmark version, the data content peculiar to the newer version, and arranging all the indexes of data contents according to their subscripts in the newer version.

The device further comprises a common information extractor, which is used for extracting data contents common between all the newer versions in a version phase (e.g. one week) in respect of the benchmark version, and the common data contents peculiar to all the newer versions; indexing and storing these common data contents only once.

The device further comprises a data restoring processor, which is used for restoring the newer version according to beginning positions of all the data blocks in the index set for the newer version.

Data documents mentioned above include various document formats known in the computer fields. For example, the documents formats include Word, Excel, PDF, image documents, video documents etc.

The above is only the preferred embodiments of the present invention and the present invention is not limited to the above embodiments. Therefore, any modifications, substitutions and improvements to the present invention are possible without departing from the spirit and scope of the present invention.

What is claimed is:

1. A multi-version control method for data documents, the method comprising steps of:

A. generating data-block fingerprints for all data blocks of a benchmark version; and B. determining common data contents between a newer version and the benchmark version according to the data-block fingerprints; and indexing the common data contents with an index containing a length of the common data contents and locations of the common data contents between the benchmark version and the newer version; based on these indexes, determining particular data contents which are contained in the newer version but not contained in the benchmark version;

the step B comprising:

B1. starting from the beginning position of the newer version, generating the data-block fingerprint for the fixed-length data block;

B2. performing a binary search on the rearranged data-block fingerprints of the benchmark version; determining whether the data-block fingerprint of the newer version appears in the rearranged data-block fingerprints of the benchmark version or not; if yes, proceeding to step B3; otherwise, proceeding to step B6;

B3. determining whether the contents of the data block of the newer version are identical to contents of a corresponding data block of the benchmark version or not; if yes, proceeding to step B4; otherwise, proceeding to step B6;

B4. expanding and comparing the identical data contents for the data block of the newer version and the data contents of the data block in the benchmark version; terminating the expanding and comparing when related data contents are distinct; indexing the common data contents; and proceeding to step B5;

B5. determining whether the last data block of the newer version has been traversed or not; if yes, indexing the data contents peculiar to the newer version and terminating a current process; otherwise, generating a data-block fingerprint for the data block starting at a beginning position of the newer version which has not been traversed, and then returning to step B2; and B6. determining whether the last data block in the newer version has been traversed or not; if yes, indexing the data contents peculiar to the newer version and terminating the current process; otherwise, in the newer version, shifting the current data block forward by pre-set bytes to obtain another data block of fixed length, and generating a data-block fingerprint for the newer data block, and then returning to step B2, wherein the step A comprises: starting from a beginning position of the benchmark version, partitioning each data block into some fixed-length sub-blocks, the length of each sub-block is equal to a length of the data-block fingerprint; performing an exclusive-OR (XOR) operation on data contents of the sub-blocks, and a result of XOR is used as the data-block fingerprint; and wherein the step A comprises: rearranging the data-block fingerprints for all data blocks in the benchmark version by heap sort; and among the rearranged data-block fingerprints, only preserving all the data-block fingerprints that appears no more than a predetermined number.

2. The method according to claim 1, wherein the step A comprises: obtaining the data-block fingerprint of a current data block by performing the XOR operation on a data-block fingerprint of a previous data block, data contents of a first sub-block in the previous data block, and data contents of a last sub-block in the current data block.

3. The method according to claim 1, wherein the step B4 of expanding and comparing the identical data contents for the data block of the newer version and the data contents of the data block in the benchmark version comprises: comparing consecutively the data contents in a forward direction and in a backward direction.

4. The method according to claim 1, further comprising, after the step B, arranging the indexes of the data contents for various parts to generating a set of indexes for the newer version, the set of indexes contains indexes of the data contents peculiar to the newer version and indexes of the identical data contents; and sorting the set of indexes according to beginning positions of data blocks in the newer version.

5. The method according to claim 1, further comprising step C after the step B: for various newer versions in a version phase, extracting the common data block contents in respect of the benchmark version as well as the common data block contents peculiar to newer versions; and sorting the common data block contents only once.

6. The method according to claim 5, further comprising: after the step C, during restoration of the newer version, restoring the newer version according to the beginning positions of various data blocks in the set of indexes for the newer version.

7. A multi-version control device for data documents, comprising a processor configured to:

A. generate data-block fingerprints for all data blocks of a benchmark version; and B. determine common data contents between a newer version and the benchmark version according to the data block fingerprints; and indexing the common data contents with an index containing a length of the common data contents and locations of the common data contents between the benchmark version and the newer version; based on these indexes, determining particular data contents which are contained in the newer version but not contained in the benchmark version;

wherein B is performed by:

B1. starting from the beginning position of the newer version, generating the data-block fingerprint for the fixed-length data block;

B2. performing a binary search on the rearranged data-block fingerprints of the benchmark version; determining whether the data-block fingerprint of the newer version appears in the rearranged data-block fingerprints of the benchmark version or not; if yes, proceeding to step B3; otherwise, proceeding to step B6;

B3. determining whether the contents of the data block of the newer version are identical to contents of a corresponding data block of the benchmark version or not; if yes, proceeding to step B4; otherwise, proceeding to step B6;

B4. expanding and comparing the identical data contents for the data block of the newer version and the data contents of the data block in the benchmark version; terminating the expanding and comparing when related data contents are distinct; indexing the common data contents; and proceeding to step B5;

B5. determining whether the last data block of the newer version has been traversed or not; if yes, indexing the data contents peculiar to the newer version and terminating a current process; otherwise, generating a data-block fingerprint for the data block starting at a beginning position of the newer version which has not been traversed, and then returning to step B2; and B6. determining whether the last data block in the newer version has been traversed or not; if yes, indexing the data contents peculiar to the newer version and terminating the current process; otherwise, in the newer version, shifting the current data block forward by pre-set bytes to obtain another data block of fixed length, and generating a data-block fingerprint for the newer data block, and then returning to step B2, wherein the data-block fingerprint extractor is configured to generate data-block fingerprints of all data blocks with fixed lengths in the benchmark version, and to generate a data-block fingerprint of a data block with a fixed length in the newer version; and wherein the data-block fingerprint extractor is further configured to re-arrange all the data-block fingerprints of the benchmark version by heap sort; and in the re-arranged data-block fingerprints, to preserve all the data-block fingerprints that appear no more than a predetermined number.

8. The device according to claim 7, wherein the processor further comprises: a data block fingerprint comparator, a data-block content comparator and an index generator, the data-block fingerprint comparator being configured to determine whether there exists a data-block fingerprint in the benchmark version that is identical to the data-block fingerprint in the newer version or not; if yes, being configured to notify the data-block content comparator to compare data block contents; otherwise, being configured to notify the data-block fingerprint extractor to generate a data-block fingerprint of a next data block in the newer version;

the data-block content comparator being configured to compare whether the contents of two data blocks with the common data-block fingerprints are identical or not; if yes, being configured to expand and compare around the two data blocks until running into distinct data contents, and to provide the obtained common data contents to the index generator;

otherwise, being configured to notify the data-block fingerprint extractor of generating the data-block fingerprint for the next data block in the newer version; and the index generator being configured to index the common data block contents between the newer version and the benchmark version and the data contents peculiar to the newer version, and being configured to sort the indexes of the data contents of the various parts according to their turns in the newer version.

9. The device according to claim 8, further comprising a common information extractor configured to extract common data block contents of various newer versions in one version phase relative to the benchmark version and the common data block contents peculiar to the newer versions; and to sort the common data block contents only once.

10. The device according to claim 8, further comprising a data restoring processor configured to restore the newer version according to beginning positions of various data blocks in a set of indexes in the newer version.

* * * * *

UNITED STATES PATENT AND TRADEMARK OFFICE
CERTIFICATE OF CORRECTION

PATENT NO. : 8,108,348 B2
APPLICATION NO. : 12/231474
DATED : January 31, 2012
INVENTOR(S) : Zeming Xu et al.

It is certified that error appears in the above-identified patent and that said Letters Patent is hereby corrected as shown below:

Col. 9, Line 61
Insert --the-- before "newer versions"

Signed and Sealed this
Fifth Day of March, 2013

Teresa Stanek Rea
*Acting Director of the United States Patent and Trademark Office*